(12) United States Patent
Ta Phuoc et al.

(10) Patent No.: US 9,660,408 B2
(45) Date of Patent: May 23, 2017

(54) ALL OPTICAL HIGH ENERGY RADIATION SOURCE

(71) Applicants: Kim Ta Phuoc, Paris (FR); Cedric Thaury, Montigny le Bretonneux (FR); Rahul Shah, Los Alamos, NM (US); Sebastien Corde, Versailles (FR)

(72) Inventors: Kim Ta Phuoc, Paris (FR); Cedric Thaury, Montigny le Bretonneux (FR); Rahul Shah, Los Alamos, NM (US); Sebastien Corde, Versailles (FR)

(73) Assignees: ECOLE POLYTECHNIQUE, Palaiseau (FR); CENTRE NATIONAL DE LA RECHERCHE SCIENTIFIQU—CNRS, Paris (FR); ECOLE NATIONALE SUPERIEURE DE TECHNIQUES AVANCEES, Paris (FR)

( * ) Notice: Subject to any disclaimer, the term of this patent is extended or adjusted under 35 U.S.C. 154(b) by 123 days.

(21) Appl. No.: 14/394,240

(22) PCT Filed: Apr. 11, 2013

(86) PCT No.: PCT/EP2013/057586
§ 371 (c)(1),
(2) Date: Oct. 13, 2014

(87) PCT Pub. No.: WO2013/153156
PCT Pub. Date: Oct. 17, 2013

(65) Prior Publication Data
US 2015/0085892 A1      Mar. 26, 2015

(30) Foreign Application Priority Data

Apr. 13, 2012 (EP) .................................... 12305443

(51) Int. Cl.
*H05G 2/00* (2006.01)
*H01S 3/00* (2006.01)
*H01S 3/0955* (2006.01)

(52) U.S. Cl.
CPC ............ *H01S 3/005* (2013.01); *H01S 3/0955* (2013.01); *H05G 2/00* (2013.01)

(58) Field of Classification Search
CPC .......... H05G 2/001; H05G 2/008; H05G 2/00; H05G 2/003; H05G 2/006
See application file for complete search history.

(56) References Cited

U.S. PATENT DOCUMENTS 4,538,275 A * 8/1985 Szu ..................... H01S 3/0903
315/4
6,285,743 B1 * 9/2001 Kondo .................. B82Y 10/00
378/119

(Continued)

OTHER PUBLICATIONS

International Search report and Written Opinion for related International Application PCT/EP2013/057586; report dated on Jul. 2, 2013.

(Continued)

*Primary Examiner* — Dani Fox
(74) *Attorney, Agent, or Firm* — Miller, Matthias & Hull LLP

(57) ABSTRACT

A method for producing electromagnetic radiation comprising: firing a first laser pulse and generating a plasma region, the first laser pulse penetrating at least partially into the plasma region to create a plasma density wake in the plasma region; providing a group of charged particles in the plasma region arranged so as to be accelerated in the plasma density wake of the first laser pulse; reflecting the first laser pulse after the first laser pulse has penetrated into the plasma region, to give a reflected laser pulse; and arranging the (Continued)

reflected laser pulse to interact with the group of charged particles to generate an electromagnetic radiation.

13 Claims, 4 Drawing Sheets

(56) References Cited

U.S. PATENT DOCUMENTS

2004/0195951 A1   10/2004   Suk et al.
2010/0290587 A1   11/2010   Umstadter et al.

OTHER PUBLICATIONS

"Thomson-backscattered x-rays from laser-accelerated electrons" to H. Schwoerer, B. Liesfeld, H-P. Schlenvoigt, K-U. Amthor & R. Sauerbrey (Phys. Rev. Lett. 96, 014802 (2006)).

"Physics of laser-driven plasma-based accelerators" to E. Esarey, C.B Schroeder, and W.P. Leemans (Rev. Mod. Phys. 81, 1229-1285, 2009).

"Investigation of ionization induced trapping in a laser wakefield accelerator" to A.E. Pak et al. (Proceedings of PAC09, Vancouver Canada, p. 3031-3033).

"Complete characterization of plasma mirrors and development of a single-shot carrier-envelope phase meter" to Tibor Wittmann (PhD thesis, University of Szeged, 2009).

Wenmin Zhang et al: "Generating intense ultrashort radiation by reflecting an ultrashort laser pulse from a thin target", Applied physics letters, vol. 99, No. 14, Jan. 1, 2011 (Jan. 1, 2011), pp. 141501-141501-3, XP055038879, ISSN: 0003-6951, DOI: 10.1063/1.3645630 abstract col. 1, par. 2, title.

"Complete characterization of a plasma mirror for the production of high-contrast ultraintense laser pulses", G. Doumy, F. Quere, O. Gobert, M. Pedrix, and Ph, Martin.

"Interaction of Ultra-High Laser Fields with Beams and Plasmas" Eric Esarey and Phillip Srangle, Beam Physics Branch, Plasma Physics Division.

* cited by examiner

ALL OPTICAL HIGH ENERGY RADIATION SOURCE

CROSS-REFERENCE TO RELATED APPLICATION

This application is a 35 USC §371 U.S. national stage filing of International Patent Application No. PCT/EP2013/057586 filed on Apr. 11, 2013, and claims priority under the Paris Convention to European Patent Application No. 12305443.9 filed on Apr. 13, 2012.

FIELD OF THE DISCLOSURE

The instant invention relates to a method and an apparatus for generating electromagnetic radiation, more precisely, the invention relates to methods and apparatus for generating x-rays and gamma-rays using Compton backscattering.

BACKGROUND OF THE DISCLOSURE

X-ray radiation sources are well known and employed in numerous applications ranging from medical imaging and diagnostic to industrial radiography and material analysis among others. Examples of such X-ray radiation sources are X-ray tubes which are the most commonly used X-ray radiation sources in medical facilities.

However, many sources, including X-ray tubes, have inherent limitations coming from their use of the Bremsstrahlung effect to generate X-rays. These sources can only generate broad band energy spectra, have a large source size which limits the maximum resolution and a low brightness, to name only a few.

Other sources have been developed including radioactive sources, synchrotron facilities and particle accelerator Compton sources. However, all these alternatives have strong drawbacks which limit their widespread use. For instance, radioactive sources contain potentially hazardous materials whose storage and use involve strict regulations. Synchrotron facilities and Compton sources are usually large facilities which can not foe easily used in industrial and medical environments.

Knowing these limitations, several attempts have been made over the years to develop table top sources that would show better characteristics.

Radiation sources based on laser driven plasma accelerators are promising candidates, given the compactness and low cost of these systems, and several attempts to design such sources have been reported.

In particular, Compton scattering (also called Thomson scattering) a photon beam off a relativistic electron bunch produced by a laser driven plasma accelerator has been proposed as a source of high-energy and high-brightness photons, using the modest electron energies obtained with existing laser systems.

"Thomson-backscattered x-rays from laser-accelerated electrons" to H. Schwoerer, B. Liesfeld, H-P. Schlenvoigt, K-U. Amthor & R. Sauerbrey (Phys. Rev. Lett. 96, 014802 (2006)) discloses such a Compton scattering scheme using two lasers pulses, the first laser pulse driving the plasma accelerator the second laser pulse achieving Compton scattering of the accelerated electron beam.

However, such laser-plasma based approaches to Compton scattering have not, to-date, produced x-rays above a kilo-electron-volt and their specifications, in terms of reliability, brightness, tunability, spectrum or repetition rates, have currently prevented them from achieving commercial success.

The present invention aims at improving this situation by providing a novel method for producing electromagnetic radiation as well as a novel electromagnetic radiation source.

SUMMARY OF THE DISCLOSURE

To this aim, according to the invention, such a method for producing electromagnetic radiation comprises:
  firing a first laser pulse and generating a plasma region, said first laser pulse penetrating at least partially into said plasma region to create a plasma density wake in said plasma region;
  providing a group of charged particles in the plasma region arranged so as to be accelerated in the plasma density wake of the first laser pulse;
  reflecting the first laser pulse after said first laser pulse has at least partially penetrated into said plasma region, to give a reflected laser pulse; and
  arranging said reflected laser pulse to interact with said group of charged particles so as to generate an electromagnetic radiation.

With these features, the spectrum of the electromagnetic radiation can be designed to be a broadband spectrum or a monochromatic radiation depending on the application. The frequency of the monochromatic radiation is easily tunable by using various means, including for instance, changing plasma density profile or firing another laser. The source size is micrometric giving an improved resolution. The duration of the electromagnetic radiation pulse can be very short, a few tens of femtoseconds or even less, which is critical for material research applications. The apparatus is compact. The electromagnetic radiation is triggered by laser pulses and can be easily synchronized with other apparatus.

In some embodiments of said method, one might also use one or more of the following features:
  reflecting the first laser pulse comprises generating a plasma mirror by the interaction of a rising edge of the first laser pulse with an obstacle;
  the plasma region is generated by the interaction of a rising edge of the first laser pulse with a gas;
  the plasma region is generated prior to the firing of the first laser pulse;
  providing the group of charged particles comprises trapping charged particles of the plasma region in the plasma density wake of the first laser pulse;
  providing the group of charged particles comprises: generating said group of charged particles externally to the plasma region and injecting said group of charged particles in the plasma region;
  providing the group of charged particles comprises providing a density gradient in the plasma region, said density gradient being arranged so as to be penetrated at least partially by the plasma density wake of the first laser pulse in order to provide said group of charged particles;
  the method further comprising generating a third laser pulse, wherein said third laser pulse is arranged to overlap with said first laser pulse at least partially into said plasma region, in order to trap charged particles of the plasma region in the plasma density wake of said first laser pulse;
  the method further comprising deviating the group of charged particles after the generation of said electromagnetic radiation.

According to another aspect of the invention there is provided an electromagnetic radiation source comprising:
- a laser source to fire a first laser pulse;
- means for generating a plasma region, the first laser pulse penetrating at least partially into said plasma region to create a plasma density wake in said plasma region; and
- means for providing a group of charged particles in the plasma region, said group of charged particles being arranged so as to be accelerated in the plasma density wake of the first laser pulse, said source being characterized in that it comprises
- means for reflecting the first laser pulse after said first laser pulse has at least partially penetrated into said plasma region, to give a reflected laser pulse, said reflected laser pulse being arranged to interact with the group of charged particles and generate an electromagnetic radiation.

In some embodiments, one might also use one or more of the following features:
- said mean for reflecting the first laser pulse comprises a plasma mirror;
- said plasma mirror is generated by the interaction of a rising edge of a laser pulse with an obstacle;
- said means for generating a plasma region comprise(s) means for providing a gas, said gas being arranged to be at least partially penetrated by the first laser pulse, the plasma region being generated by the interaction of a rising edge of the laser pulse with said gas;
- said means for generating a plasma region comprise(s) means for providing a gas and one or a combination of the following: a discharge circuit for firing a discharge into said gas to create said plasma region, and a second laser pulse arranged to penetrate at least partially into said gas, the interaction of a rising edge of said second laser pulse with said gas creating said plasma region;
- said means for providing a group of charged particles in the plasma region comprise(s) one or a combination of the following: said first laser pulse, a third laser pulse arranged to overlap with the first laser pulse at least partially into the plasma region, a density gradient of the plasma region, means for generating a group of charged particles externally to the plasma region and means for injecting said group of charged particles in the plasma region;
- the electromagnetic radiation source further comprises a collimating window arranged to stop the peripheral part of the electromagnetic radiation.

BRIEF DESCRIPTION OF THE DRAWINGS

Other characteristics and advantages of the invention will readily appear from the following description of several of its embodiments, provided as non-limitative examples, and of the accompanying drawings.

On the drawings.

On the different figures, the same reference signs designate like or similar elements.

DETAILED DESCRIPTION OF THE DISCLOSURE

Figure 1:
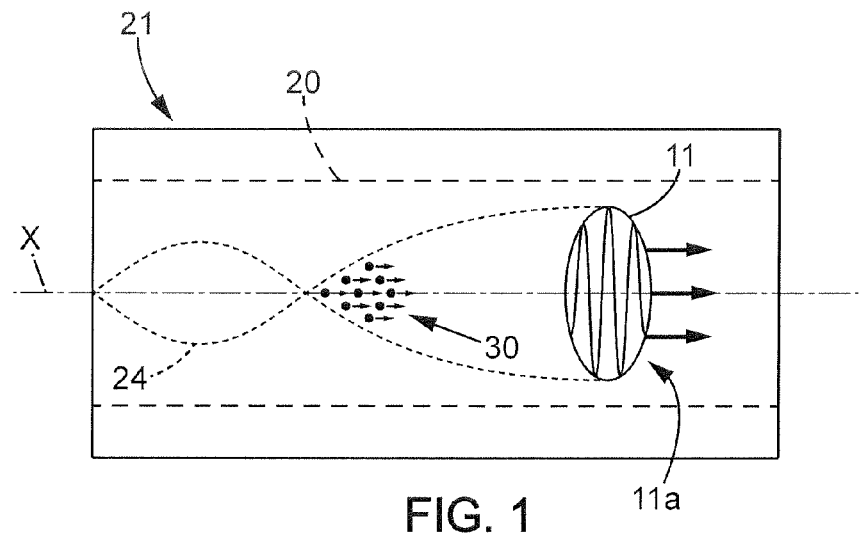
FIG. 1 is an illustration of a laser pulse travelling in a plasma or a gas.
Figure 2:
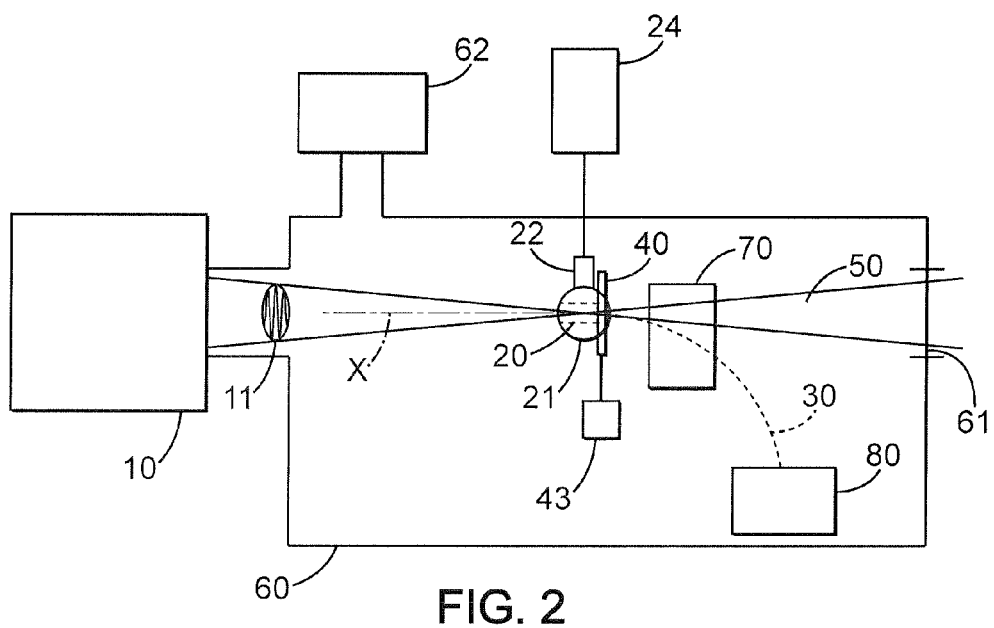
FIG. 2 is an illustration of an embodiment of an electromagnetic radiation source according to the invention.

With reference to FIG. 1, which illustrates a schematic of a laser pulse travelling in a plasma or a gas, the general working principle of laser driven plasma accelerators will be summarized.

Like a boat cruising on a lake pushes water out of its way, leaving a wake of oscillating waves in its track, a high energy laser pulse 11 travelling in a plasma 20 generates a so-called plasma density wake 24.

This plasma density wake 24 has been showed since the 90's to form an accelerating structure in which huge electric fields are generated in the plasma as a result of the density oscillations of the charged particles constituting the plasma 20.

These enormous electric fields are able to accelerate bunches of charged particles 30 up to giga-electronvolt energies in a distance of just a few millimeters (over 100 MeV/mm).

Laser driven plasma accelerator, also known as laser plasma interaction sources or wake-field accelerators, can thus be employed as very compact sources of high energy charged particles bunches that are inherently synchronized with a laser beam.

More detailed descriptions of the operations and characteristics of laser driven plasma accelerators can for instance be found in "Physics of laser-driven plasma-based accelerators" to E. Esarey, C. B Schroeder, and W. P Leemans (Rev. Mod. Phys. 81, 1229-1285, 2009).

The present invention provides an electromagnetic radiation source, or apparatus, making use of such an accelerator to generate high energy electromagnetic radiation with superior characteristics.

With further reference to FIG. 2, FIGS. 3a, 3b and 3c and FIG. 4, an electromagnetic radiation source according to several embodiments of the invention will now be described.

A laser source 10 emits, or fires, one or several first laser pulses 11.

Each first laser pulse 11 is intense enough to generate a plasma density wake in a plasma.

Each first laser pulse 11 can for instance have a power of a few hundred of megawatts or a few terawatts or more.

Each first laser pulse 11 can be shorter than a few nanoseconds, advantageously shorter than a few hundreds of femtoseconds.

Each first laser pulse 11 can have an energy ranging from a few millijoules to a few joules, for instance a few hundreds of millijoules.

In some embodiments, the laser source 10 can be arranged to emit said first laser pulses 11 with a certain repetition rate, for instance a repetition rate higher than a few hertz, and/or to be triggered externally.

Along a portion of its path, the first laser pulse 11 can propagate along a propagation direction X.

A plasma region 20 is generated so as to be at least partially penetrated by said first laser pulses 11.

In a first embodiment, said plasma region 20 can be generated in the following way.

A gas 21 can be, for instance, provided by a nozzle 22, filled inside a cell 22 or a gas channel 22, or provided using any other common means of providing a gas 21.

Said gas 21 can be arranged to be at least partially penetrated by said first laser pulses 11 when said laser pulse propagate along its propagation direction X.

A plasma region 20 might then be generated by the interaction of the rising edge 11a of a first laser pulse 11 with the gas 21.

In another embodiment, a gas channel 22 or a gas cell 22 containing a gas 21 might be provided with a discharge circuit 23 able to fire an electric discharge through said gas 21 thereby ionizing the gas and generating a plasma region 20.

As a matter of illustration, an electric discharge of around 20 kV driven by a capacitor of order 2 nF can have a peak of several hundred amperes and a half period of order 200 ns sufficient for generating a plasma region 20.

In yet another embodiment, a second laser pulse 12 might be provided and arranged so as to penetrate at least partially into said gas 21 before the first laser pulse 11 penetrates into said gas 21.

The rising edge 12a of the second laser pulse 12 can interact with the gas 21 to generate said plasma region 20.

Other embodiments can be provided to generate the plasma region using method known to the skilled man.

A gas supply 24 can be provided to supply gas to the nozzle, cell, gas channel 22 or the like.

Said gas 21 can be of any suitable type, for instance gas 21 can comprise helium gas or hydrogen gas, and, as a matter of illustration, a nozzle 22 can emit a supersonic helium gas jet having a length of 3 mm, taken along the propagation direction X of the first laser pulse 11.

Said gas 21 can possess a plateau 21a and two side portions 21b on its sides along the propagation direction X.

The gas density can be substantially constant along the plateau 21a and decrease along said side portions 21b.

The plasma region 20 being at least partially penetrated by said first laser pulses 11, a plasma density wake 24 can be created in the plasma region 20 by the interaction of said first laser pulse 11 with said plasma region 20.

A group of charged particles 30, also called a bunch of charged particles 30, can be provided in the plasma density wake 24.

In a first embodiment, said charged particles 30 can be provided by promoting acceleration of charged particles from the plasma region itself. This technique has been called "self-injection" and consists in trapping, in the plasma density wake 24, charged particles belonging to the plasma of the plasma region 20.

In a variant, said trapping can be controlled with the help of a third laser pulse 13.

In yet another variant, said trapping can be controlled with the help of a third and a forth laser pulses.

In a first embodiment of said variant, the third laser pulse 13 can be provided in a colliding optical scheme, propagating along a propagation direction Y.

Said third laser pulse 13 can be arranged to overlap, in space and time, with the first laser pulse 11, the overlapping position and time being at least partially into said plasma region 20.

In an embodiment of the invention, the propagation direction Y of the third laser pulse can be comprised within a small angle of the propagation direction X of the first laser pulse 11 and the third laser pulse can be propagating backward compared to the first laser pulse 11.

The overlap, or collision, of said laser pulses can provide charged particles 30, trapped from the plasma region 20, in the plasma density wake 24 of said first laser pulse 11 at the overlapping position.

This technique allows for a precise control of charged particles energy and, in some embodiment, gives a tunable mono-energetic charged particle bunch 30 that in turn can emit tunable mono-energetic electromagnetic radiation 50.

The third laser pulse 13 might be generated by the same laser source 10 than the first laser pulse 11 or might be generated by another laser source.

In a second embodiment of said variant, the third laser pulse 13 can penetrate at least partially into the plasma region 20 or the gas 21 and create a density gradient 25, for instance a density depletion.

Advantageously, the density gradient 25 can be generated before the first laser pulse 11 penetrates into the plasma region 20.

Said density gradient 25 might be arranged so as to be at least partially penetrated by the first laser pulse 11.

The penetration of said density gradient 25 by the first laser pulse 11 can provide charged particles 30 trapped from the plasma region 20 in the plasma density wake 24 of said first laser pulse 11.

In a variant, said density gradient 25 can be provided in the plasma region 20 by other means, such as reducing or increasing the density of the gas 21 in a region.

In yet another variant, said charged particles 30 can be provided by employing a gas mix such as the method described in "Investigation of ionization induced trapping in a laser wakefield accelerator" to A. E. Pak et al. (Proceedings of PAC09, Vancouver Canada, p 3031-3033).

In yet another embodiment, said charged particles 30 might be generated externally to the plasma region, for instance with a conventional particle accelerator or an ionizing apparatus.

These externally generated particles might then be injected in the plasma density wake 24 to be accelerated.

Figure 3A:
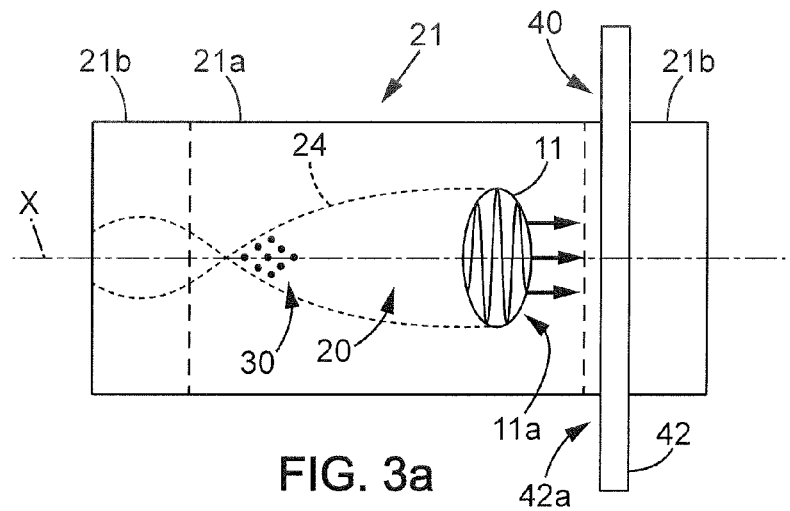
FIG. 3a is an illustration of a first laser pulse propagating in a gas.
Figure 3B:
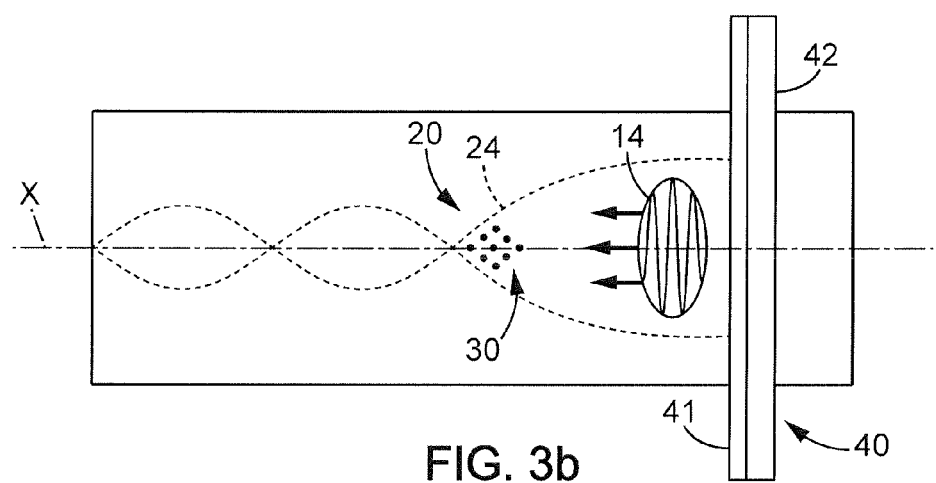
FIG. 3b is an illustration of a reflected laser pulse propagating after reflection from a reflecting element.
Figure 3C:
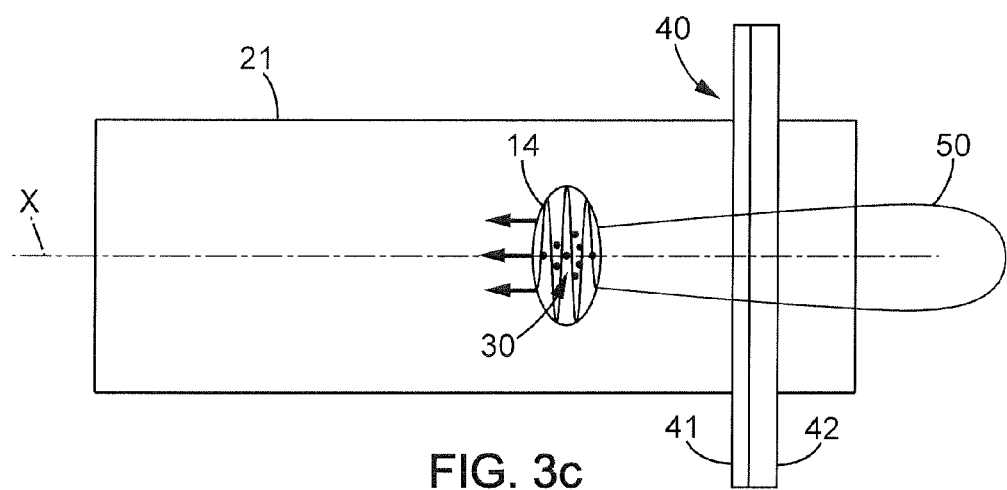
FIG. 3c is an illustration of an interaction between a reflected laser pulse and a group of charged particles.
Figure 4:
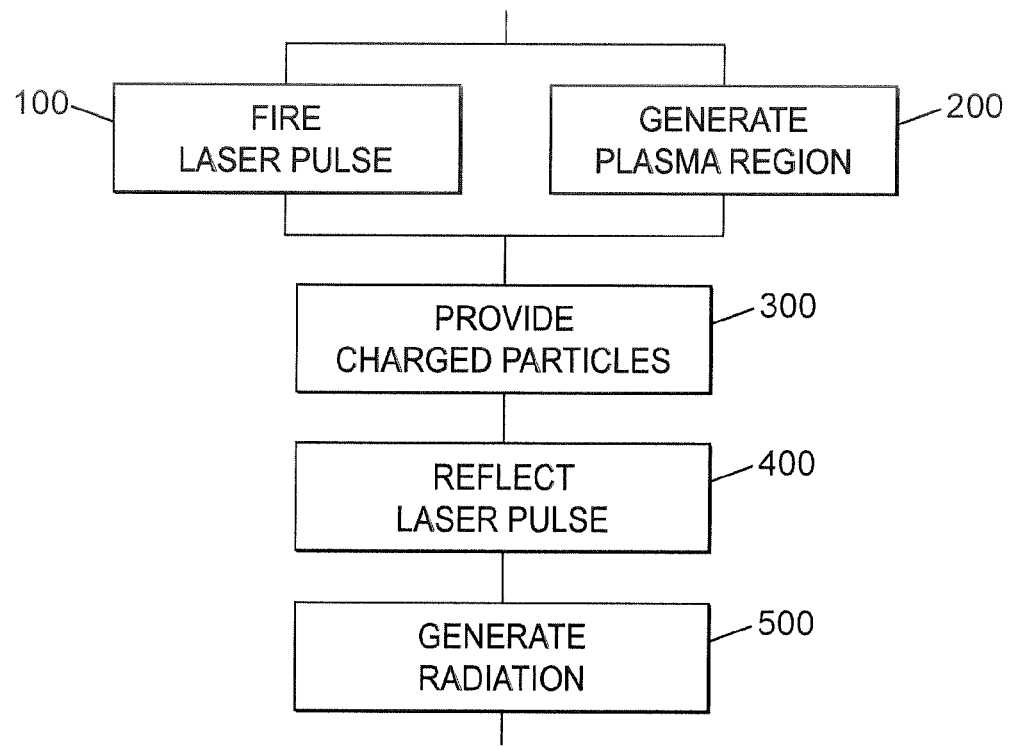
FIG. 4 is a flowchart of a method for producing electromagnetic radiation according to an embodiment of the invention.

As illustrated on FIG. 3b, the first laser pulse 11 can then be reflected by a reflecting element 40 to give a reflected laser pulse 14.

Advantageously, the first laser pulse 11 can be reflected after it has at least partially penetrated into the plasma region 20.

This reflecting element 40 can comprise a plasma mirror 41.

A plasma mirror 41 can, for instance, be created by the interaction of the rising edge of a laser pulse, for instance of the first laser pulse 11, with an obstacle 42.

Said obstacle 42 can be solid foil, liquid jet or high density gas.

Examples of said obstacle 42 are a glass foil, an aluminum foil, a CH foil, a liquid jet, a gas jet and so on.

The obstacle 42 might be mounted on a displacement module 43 able to displace the obstacle 42 along one or more directions of space.

Said displacement of the obstacle 42 might be used to adjust the position of the obstacle 42 and/or to present a novel surface 42a of the obstacle 42 at each reflection of a laser pulse 11 if several first laser pulses 11 are sequentially fired.

In a variant, said obstacle 42 might be provided by a liquid nozzle able to supply a liquid jet.

Several descriptions of plasma mirrors can be found, for instance, in "Complete characterization of plasma mirrors and development of a single-shot carrier-envelope phase meter" to Tibor Wittmann (PhD thesis, University of Szeged, 2009) and the references therein.

As detailed thoroughly in the reference to Tibor Wittmann, the primary use of plasma mirrors, up to now, has been contrast improvement technique since these mirrors are able to suppress the unavoidable pedestals and leading prepulses that appear during the amplification process of high-power lasers.

A plasma mirror 41 can be created as follow. The surface 42a of said obstacle 42 is ionized by the rising edge of first laser pulse 11 and turns into a dense plasma, a plasma mirror 41, which efficiently reflects the remaining of the first laser pulse 11 in a reflected laser pulse 14.

It should be highlighted that, contrary to the plasma region 20, the plasma mirror 14 is a dense plasma which explains its differing behavior. This differing behavior will be quickly explained in the following.

Electromagnetic waves with a frequency smaller than the critical frequency of a plasma are reflected back. The critical frequency of a plasma is related to the density said plasma. For instance and under some assumptions (detailed for instance in above mentioned "Complete characterization of plasma mirrors and development of a single-shot carrier-envelope phase meter" to Tibor Wittmann), said critical frequency can be expressed by the relation $$\omega_c^2 = n \times \frac{e^2}{m_e \varepsilon_0}$$

where e and $m_e$ are respectively the charge and the rest mass of the electron, $\varepsilon_0$ is the permittivity of free space, n is the plasma electron density and $\omega_c$ is said critical frequency.

It is thus evident that a dense plasma, such as the plasma mirror 41, having a higher density n than the plasma region 20 possesses a higher critical frequency $\omega_c$ and will thus be able to reflect back the first laser pulse 11 while a less dense plasma, such as the plasma region 20, can be penetrated by the first laser pulse 11.

In some embodiment, the reflectivity of a plasma mirror can be of the order of 70% as mentioned in "Complete characterization of a plasma mirror for the production of high-contrast ultra intense laser pulses." to G. Doumy et al. (Phys. Rev. E 69, 026402 (2004)).

In some embodiments, the reflecting element 40 can be located close to the focal point of the first laser pulse 11.

In some embodiments, the reflecting element 40 can be located at least partially inside the plasma region 20.

In some embodiments, the reflecting element 40 can be located at least partially inside the gas 21.

In some embodiments, the reflecting element 40 can be located at least partially inside the plateau 21a of the gas 21.

In some embodiments, the reflecting element 40 can be located at least partially inside a side portion 21b of the gas 21.

In some embodiments, the reflecting element 40 can be located outside the gas 21 or the plasma region 20.

The reflecting laser pulse 14 can then propagate backward.

Advantageously, the reflecting element 40 is arranged so that the reflecting laser pulse 14 interact with the group of charged particles 30.

The reflecting element 40 can for instance be orientated substantially perpendicular to the propagation direction X of the first laser pulse 11.

The reflecting laser pulse 14 can thus interact with the group of charged particles 30 to produce electromagnetic radiation 50.

It should be noted that both the laser pulse 14 and the group of charged particles 30 have a duration of only a few femtoseconds and can be only a few micrometers wide.

Obtaining a spatial and temporal overlap between these two elements is thus a very difficult task.

The inherent overlap in space and time of said reflected laser pulse 14 with the group of charged particles 30 is an important advantage of the present invention.

The difficulty of achieving this overlap may be a reason of the lower performances exhibited by Compton sources employing two laser beams such as the sources described in "Thomson-backscattered x-rays from laser-accelerated electrons" to H. Schwoerer, B. Liesfeld, H-P. Schlenvoigt, K-U. Amthor & R. Sauerbrey (Phys. Rev. Lett. 96, 014802 (2006)).

Said electromagnetic radiation 50 can be produced by a physical effect known as Compton scattering or Thomson scattering.

Charged particles 30 travelling in an electromagnetic field, such as the electromagnetic field of the reflected laser pulse 14, oscillate and emit synchrotron-like radiation, equivalently known as Compton scattering radiation.

By way of example only, Compton scattering effect will now be described in a specific embodiment of the present invention in which said charged particles are relativistic electrons.

From a classical point of view, the electromagnetic field of the laser can be seen as conventional undulator or a wiggler, where the electrons oscillate and emit moving charge radiation.

In the "head on" geometry of some embodiments of the present invention, where the group of charged particles 30, for instance relativistic electrons, and the reflected laser pulse 14 travel in opposite directions, the equivalent undulator/wiggler is characterized by a period $\lambda_u = \lambda_L/2$ and a strength parameter $K = \alpha_0$ where $\lambda_L$ and $\alpha_0$ are respectively the wavelength and the normalized potential vector of the laser field of the reflected laser pulse 14. The normalized potential vector of the laser field can for instance be expressed as $\alpha_0 = 0.855 \times 10^{-9} \lambda_L[\mu m] \sqrt{I[W/cm^2]}$ where $$I = \frac{E(\text{Joules})}{\tau(fs) \times \text{Spot size}(cm^2)}$$

and in
  which E, $\tau$ and "spot size" are respectively the energy, the duration and the spot size of the first laser pulse 11.

In an embodiment in which $\alpha_0 < 1$, also called a "linear regime" of the laser pulse, the radiation produced by an electron is monochromatic and emitted at a fundamental wavelength $\lambda_{X0} = \lambda_u/4\gamma^2(1+\gamma^2\theta^2+\alpha_0^2/2)$ where $\gamma$ is the Lorentz factor of the electron and $\theta$ the observation angle ($\theta = 0$ on axis).

In an embodiment in which $\alpha_0 \approx 1$, the electromagnetic radiation 50 comprises a few harmonics and as $\alpha_0$ increases the spectrum of the electromagnetic radiation 50 rapidly becomes a broad continuum extending up to the critical energy proportional to $\gamma^2$ and the root of the reflected laser pulse 14 intensity.

The electromagnetic radiation 50 is emitted within a beam of divergence equal to the maximum of the divergence of the group of charged particles and $1/\gamma$.

The amount of energy emitted in the electromagnetic radiation 50 scales as $\alpha_0^2$ and $\gamma^2$.

Details on the features of an electromagnetic radiation generated by Compton scattering can be found in "Interaction of ultrahigh laser fields with beams and plasmas" to P. Sprangle and E. Esarey (Phys. Fluids B 4, 2241 (1992)).

By way of example only, an embodiment of a electromagnetic radiation source according to the invention can comprise a Ti:Sa laser system as a laser source 10 that can deliver a first laser pulse 11 with a central wavelength of 810 nm.

The first laser pulse 11 can for instance have energy of about one Joule and duration around thirty femtoseconds.

Again, by way of example only and without being limitative, the following characteristics can be used, as examples, in some embodiments of the invention employing the above mentioned Ti:Sa laser system.

The first laser pulse 11 can be focused into a gas jet 21 having a length of substantially 3 mm along the propagation axis of the first laser pulse 11.

The density of the gas jet 21 can for instance comprise a plateau 21a of substantially constant density having a length of 2.1 mm, along the direction of propagation of the first laser pulse 11, with 600 microns gradients on both sides portions 21b.

The focal spot size of the first laser pulse 11 can be about 17 microns, the first laser pulse 11 can thus have a normalized potential vector $\alpha_0 \approx 1.5$.

The period $\lambda_L$ of the laser pulse being substantially of micrometric order, an electromagnetic radiation 50 can be emitted in the x-ray range with electrons in the mega electron volt (MeV) range.

As a matter of illustration only, producing an electromagnetic radiation 50 with a fundamental energy of 10 keV requires an acceleration of electrons up to 20 MeV in the plasma density wake 24, producing an electromagnetic radiation 50 with a fundamental energy of 100 keV requires an acceleration of electrons up to 65 MeV.

The radiation can be collimated within about 20 mrad and considering a 100 pC electron bunch having duration in the order of a few tens of femtoseconds, an electromagnetic radiation 50 can contain about $10^8$ photons.

Figure 5:
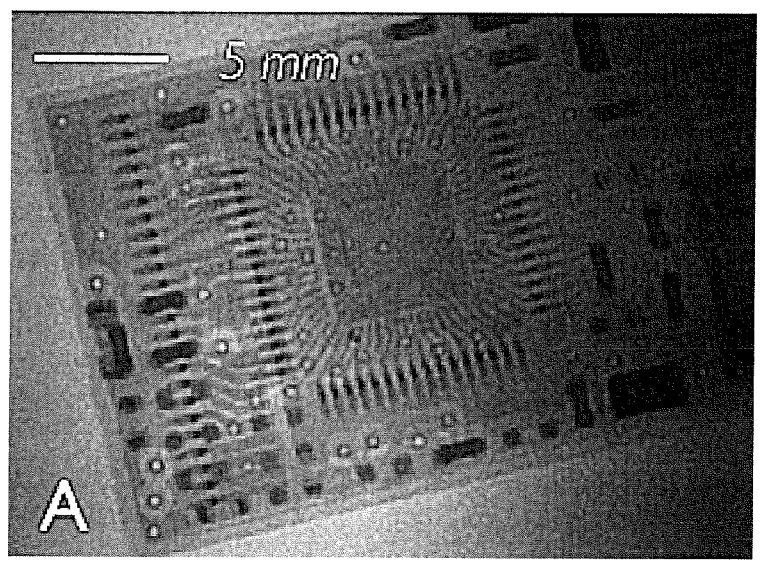
FIG. 5 is a radiograph of a USB flash drive performed using a method for producing electromagnetic radiation according to an embodiment of the invention.

An example of a radiograph of a USB flash drive is illustrated on FIG. 5.

Figure 6:
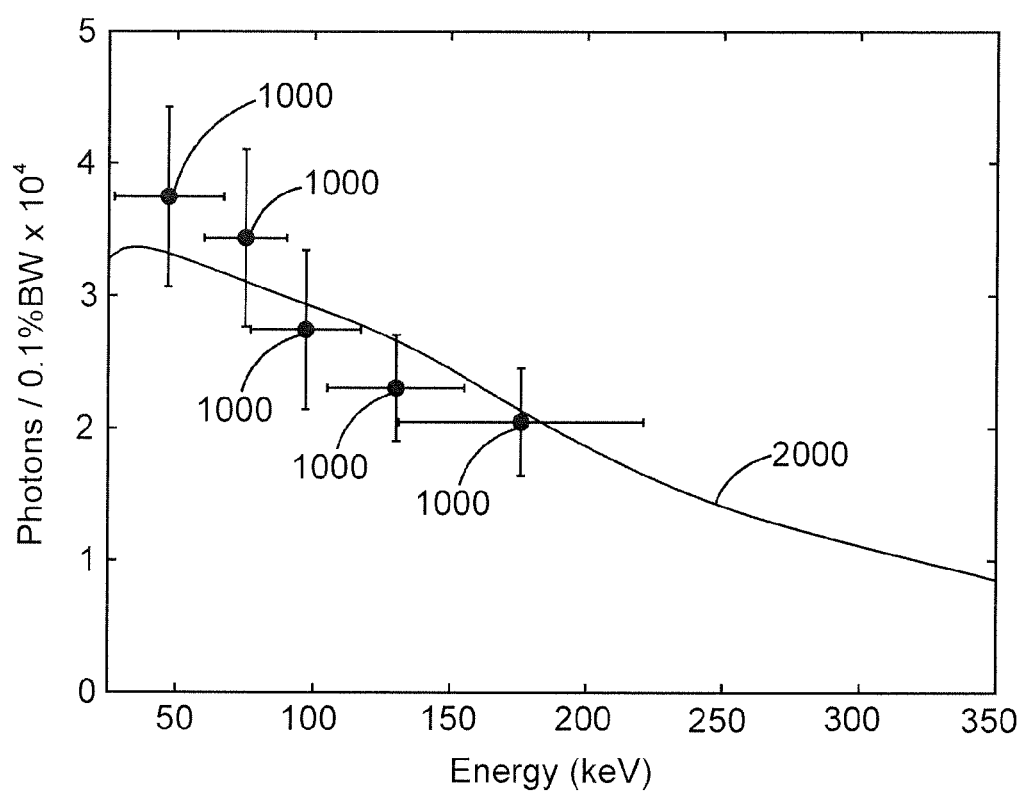
FIG. 6 is an energy spectrum of such electromagnetic radiations 50 produced using a method for producing electromagnetic radiation according to an embodiment of the invention.

An example of the energy spectrum of such electromagnetic radiations 50 is further illustrated on FIG. 6 illustrating experimental measurement points 1000 together with theoretical model results 2000.

An electromagnetic radiation source according to the invention can be provided with several additional modules.

A vacuum chamber 60 can be provided to host the above mentioned first laser pulse 11, plasma region 20, charged particles 30 and/or reflecting elements 40.

The vacuum chamber 60 can be provided with an electromagnetic radiation window 61 allowing the electromagnetic radiation 50 to leave the vacuum chamber 60.

In some embodiments of the invention, the window 61 can be smaller, in diameter or area, than the electromagnetic radiation 50 beam in order to stop the peripheral radiation of said beam and keep only the central part of said beam, being the part that is closer to the propagation direction X.

Since the frequency of electromagnetic radiation 50 depends on its angle with the propagation direction X, such a window 61 can improve the monochromaticity of electromagnetic radiation 50.

In a variant, such a collimating window can be provided on another element than the vacuum chamber 60, for instance a radiation blocking module provided inside or outside the vacuum chamber 60.

The vacuum chamber 60 can be set and maintained under vacuum using one or several vacuum pump 62.

A magnet 70 can be provided in the path of the charged particles 30, for instance after the reflecting element 40.

The magnet 70 can deflect the group of charged particles 30 out of the path of the electromagnetic radiation 30 thereby allowing for a separation of electromagnetic radiation 50 from charged particles 30.

A stopping module 80 can be provided to stop the group of charged particles 30.

The invention claimed is:

1. A method for producing x-ray radiation using a laser driven plasma accelerator, the method comprising:
   firing a first laser pulse and generating a plasma region, said first laser pulse penetrating at least partially into said plasma region to create a plasma density wake in said plasma region; and
   providing a group of charged particles in the plasma region arranged so as to be accelerated in the plasma density wake of the first laser pulse,
   said method being characterized in that it comprises:
   reflecting the first laser pulse after said first laser pulse has at least partially penetrated into said plasma region, to give a reflected laser pulse; and
   arranging said reflected laser pulse to interact with said group of charged particles so as to generate x-ray radiation,
   wherein reflecting the first laser pulse comprises generating a plasma mirror by the interaction of a rising edge of the first laser pulse with an obstacle, and
   wherein the plasma mirror is a dense plasma having a higher density than the plasma region to be able to reflect back the first laser pulse while the plasma region can be penetrated by the first laser pulse.

2. The method according to claim 1, wherein the plasma region is generated by the interaction of a rising edge of the first laser pulse with a gas.

3. The method according to claim 1, wherein the plasma region is generated prior to the firing of the first laser pulse.

4. The method according to claim 1, wherein providing the group of charged particles comprises trapping charged particles of the plasma region in the plasma density wake of the first laser pulse.

5. The method according to claim 1, wherein providing the group of charged particles comprises:
   generating said group of charged particles externally to the plasma region and
   injecting said group of charged particles into the plasma region.

6. The method according to claim 1, wherein providing the group of charged particles comprises providing a density gradient in the plasma region, said density gradient being arranged so as to be penetrated at least partially by the plasma density wake of the first laser pulse in order to provide said group of charged particles.

7. The method according to claim 1, further comprising generating a third laser pulse, wherein said third laser pulse is arranged to overlap with said first laser pulse at least partially in said plasma region, in order to trap charged particles of the plasma region in the plasma density wake of said first laser pulse.

8. The method according to claim 1, further comprising deviating the group of charged particles after the generation of said electromagnetic x-ray radiation.

9. An electromagnetic x-ray radiation source using a laser driven plasma accelerator and comprising:
- a laser source to fire a first laser pulse;
- means for generating a plasma region, the first laser pulse generating at least partially into said plasma region to create a plasma density wake in said plasma region; and
- means for providing a group of charged particles in the plasma region, said group of charged particles being arranged so as to be accelerated in the plasma density wake of the first laser pulse, said source being characterized in that it comprises
- means for reflecting the first laser pulse after said first laser pulse has at least partially penetrated into said plasma region, to give a reflected laser pulse, said reflected laser pulse being arranged to interact with the group of charged particles and generate an electromagnetic x-ray radiation,
- wherein said means for reflecting the first laser pulse comprises a plasma mirror, and
- wherein the plasma mirror is a dense plasma having a higher density than the plasma region to be able to reflect back the first laser pulse while the plasma region can be penetrated by the first laser pulse.

10. The electromagnetic x-ray radiation source according to claim 9, wherein said plasma mirror is generated by the interaction of a rising edge of a laser pulse with an obstacle.

11. The electromagnetic x-ray radiation source according to claim 9, wherein said means for generating a plasma region comprise(s) means for providing a gas, said gas being arranged to be at least partially penetrated by the first laser pulse, the plasma region being generated by the interaction of a rising edge of the laser pulse with said gas.

12. The electromagnetic x-ray radiation source according to claim 9, wherein said means for generating a plasma region comprise(s) means for providing a gas and one or a combination of the following: a discharge circuit for firing a discharge into said gas to create said plasma region, and a second laser pulse arranged to penetrate at least partially into said gas, the interaction of a rising edge of said second laser pulse with said gas creating said plasma region.

13. The electromagnetic x-ray radiation source according to claim 9, wherein said means for providing a group of charged particles in the plasma region comprise(s) one or a combination of the following: said first laser pulse, a third laser pulse arranged to overlap with the first laser pulse at least partially into the plasma region, a density gradient of the plasma region, means for generating a group of charged particles externally to the plasma region and means for injecting said group of charged particles in the plasma region.

* * * * *